United States Patent Office 3,269,160
Patented August 30, 1966

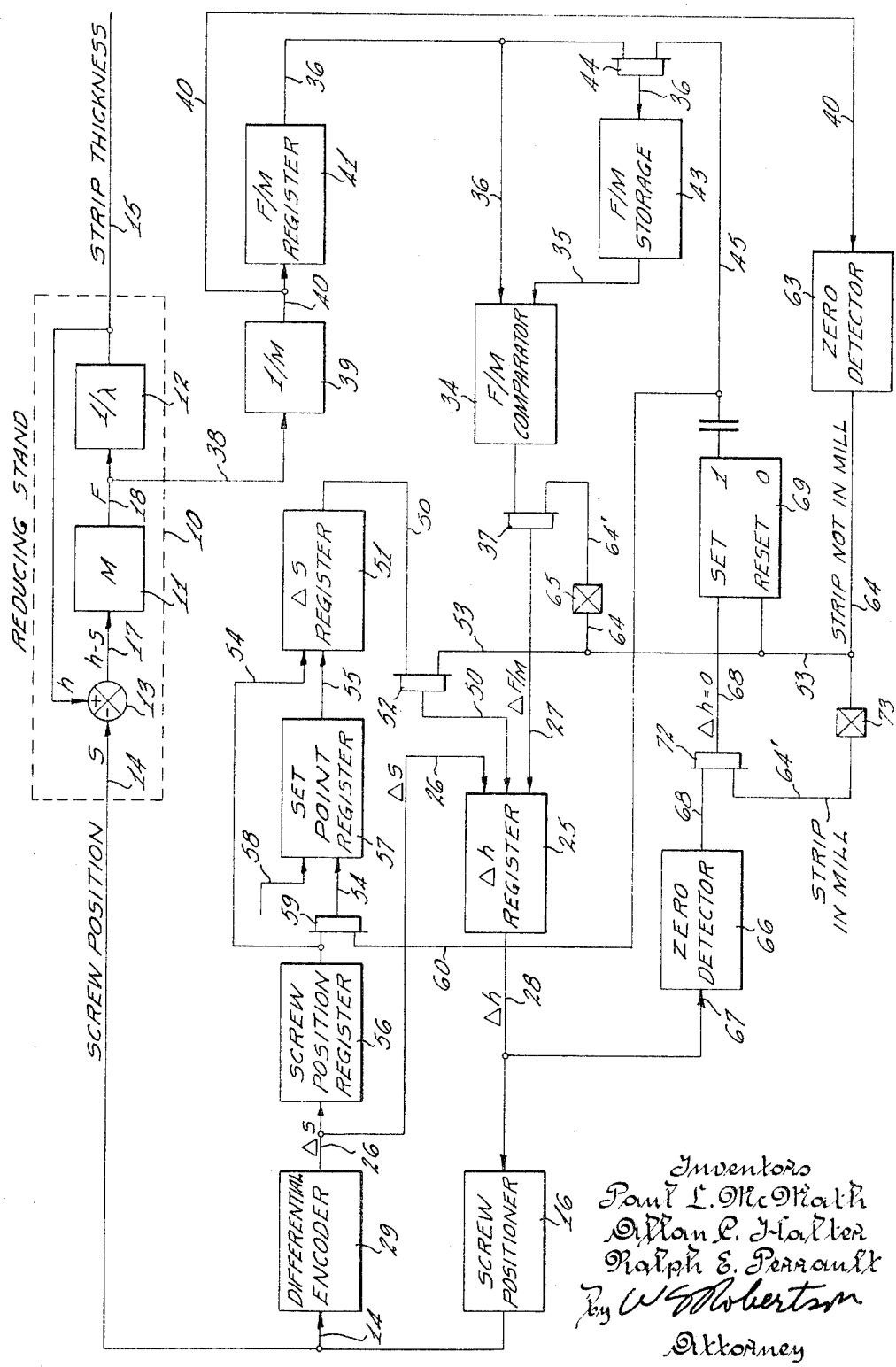

3,269,160
AUTOMATIC GAUGE CONTROL WITH UPDATE
Allan C. Halter, Milwaukee, and Paul L. McMath, Hales Corners, Wis., and Ralph E. Perrault, Monrovia, Calif., assignors, by direct and mesne assignments, to Allis-Chalmers Manufacturing Company, Milwaukee, Wis.
Filed Aug. 29, 1963, Ser. No. 305,480
12 Claims. (Cl. 72—8)

This invention relates to motor controls for metal rolling mills. More specifically, this invention relates to a control that adjusts its parameters as conditions of the mill or the rolled strip change.

One well known automatic gauge control detects errors in the thickness of the strip that is being rolled by measuring and comparing the position of the work rolls and the force of the work rolls on the strip. When the force on the work rolls increases without a change in the screw position, the mill rolls the strip overgauge; conversely, when the work roll force decreases without a change in screw position, the mill rolls the strip undergauge. This occurs because the thickness of the strip equals the actual spacing between the work rolls and the actual roll spacing equals the separation that would be measured at the screws plus the distance that the mill housing stretches under the force between the work rolls and the strip. The work roll force changes independently of strip thickness when the screw position is changed. The control combines a work roll force signal and a screw position signal in the appropriate proportions to cancel the component of force changes associated only with screw position changes; the resulting signal indicates force changes that are associated only with strip thickness changes. When the control is set up properly, changes in force correspond to errors in gauge. Such a control is in effect a model of the actual mill and subject. One of the objects of this invention is to provide a control that adjusts the parameters of this model to better represent the mill and the strip.

To establish reference values for the control, the mill operating personnel adjust the screws at the beginning of a strip until the correct gauge is reached. The gauge control then stores the existing values of initial screw position and work roll force as references. Because there is a delay in getting the proper screw position for correct gauge, the reference values that are stored in the control represent strip conditions somewhere midway along the length of the strip. Although these reference values are appropriate for a single strip, they are not optimum when a succession of closely similar strips are run through the mill.

This problem occurs because the strip cools and thereby hardens as it advances through the mill. To maintain reference gauge as the strip cools, the control or the operating personnel progressively change the screw position to increase the work roll force. These changes may require secondary changes in screw position to apportion the load among the drive motors of several reducing stands. The screw position at the cooler tail of one strip is not appropriate to the hotter leading edge of the next strip. Prior art controls have operated the screw positioner in the interval of time between successive segments to open the screws to the reference position; the reference position is approximately correct, but a significant error occurs because the leading edge of the strip differs from the point on the strip at which the control stored the reference screw position value. One of the objects of this invention is to provide a new and improved control that develops a reference screw position that more accurately corresponds to the conditions at the leading edge of the strip.

Another more specific object of the invention is to provide a new and improved control that advances the point on the strip at which the references are stored, progressively toward the leading edge as the mill rolls successive similar segments.

The control of this invention has a register that follows the screw position of the reducing stand and it has a screw reference position register (called a set point register) that stores a reference value of screw position. After the strip being rolled leaves the mill, the control opens the screws to the reference position for the next strip. Ordinarily some further change in the screw position is required on the next segment to maintain proper gauge. The control of this invention senses errors in gauge; as soon as the automatic gauge control has made the appropriate changes in screw position and the gauge is correct, the control changes the set point register to the existing screw position that is indicated by the actual screw position register. Since the gauge control corrects the error fairly quickly, the point at which the new references are stored is closer to the leading edge than before. The control keeps changing the reference after each segment to correspond to points closer to the leading edge. This updating of the reference screw position helps the automatic gauge control to get to the proper screw position quickly for each segment and to give the strip more uniformly accurate gauge. For a mill control of the type that was described, the control of this invention also updates associated parameters.

In the drawing, the single figure is a block diagram of a single reducing stand in a rolling mill, an automatic gauge control for regulating the reducing stand to maintain preselected subject thickness, and the mill update control of this invention.

*The mill and strip*

The single reducing stand 10 of the drawing is represented by two functional boxes 11 and 12 and an adder 13 that show how the reducing stand responds to the screw position 14 to establish the strip thickness 15. The reducing stand is represented functionally because the automatic gauge control that will be described later can be thought of as a model that is based on this representation. Reducing stand 10 has a screw positioner 16 that drives the work rolls to their initial position S represented by line 14. The screw position 14 is the work roll separation that can be measured at the screws at no load; is not the actual separation of the work rolls because the work rolls and the housing of reducing stand 10 must spring apart somewhat to establish the force required for rolling. The actual separation between the work rolls is significant because it equals the strip thickness 15 and the gauge control operates to keep the actual separation constant. As adder 13 and its inputs 14, 15 and its output 17 represent, the strain 17 of the housing equals the strip thickness 15 minus the initial screw position 14. The strain of the hill housing ($h-S$) and the mill spring constant M establish by Hook's law the force F between the work rolls and the strip. Functional box 11 which represents this relationship in reducing stand 10 multiplies the strain ($h-S$) by the mill spring constant M and produces the work roll force, $F = M(h-S)$, at its output 18.

The subject thickness depends on the work roll force F of output 18 and on a characteristic $\lambda$. Functional box 12 which represents this relationship receives work roll force F, multiplies it by $1/\lambda$, and represents at its output 15 the subject thickness $h$.

As a strip segment proceeds through the mill, the strip characteristics that are represented by the characteristic $\lambda$ may change and cause the work roll force F to change; as the diagram of reducing stand 10 illustrates, these changes cause the mill to roll the strip off gauge. An automatic gauge control is provided to adjust the initial work roll spacing 14 to maintain the reference gauge.

The automatic gauge control

The drawing shows a well known automatic gauge control, some of whose components are also components of the update control of this invention. The term "gauge control" will mean all the components of the gauge control whether or not some also are part of the update control; the term "update control" will means all the update control components whether or not some are part of the automatic gauge control; the term "gauge control system with update" will mean a control system with any desired duplication of components or function.

As has already been explained, the strip thickness $h$ equals the initial screw position S plus the strain 17 of the mill housing. Reading in the drawing from line 18 to line 17, the strain of the mill housing ($h-S$) equals the work roll force F multiplied by the mill spring constant M of box 11. Thus, reference values of initial screw position S and the corresponding value $F/M$ establish a reference value of strip thickness, $h=S+F/M$. The gauge control operates to maintain the reference thickness by opposing changes in $F/M$ except to the extent that these changes are offset by changes in screw position.

A $\Delta h$ register 25 receives a $\Delta S$ signal 26 and a $\Delta F/M$ signal 27 and produces their sum, $\Delta h=\Delta S+\Delta F/M$, at its output 28. Input signals 26 and 27 are in the form of pulses that count register 25 in the direction that corresponds to the direction of change of actual values of S and $F/M$. Output 28 is a count value held by register 25; it is an input to screw positioner 16 to change the screw position 14 in the proper direction to reduce signal 28 and the gauge error $\Delta h$ to zero.

Signal 26, $\Delta S$, is generated by a device 29 that is connected to reducing stand 10 to follow the actual screw position 14 and to produce a pulse at its output 26 for a predetermined small increment of screw travel.

Signal 27, $\Delta F/M$, is generated by a comparator 34 that receives a reference value 35 of $F/M$ and an existing value 36 of $F/M$. (AND gate 37 is open as will be explained later.) The actual value 36 of $F/M$ is generated from a measure 38 of work roll force 18 and a constant value of mill spring constant M that is appropriate for reducing stand 10 and for the strip being rolled. Force signal 38 may be generated by a strain gauge mounted on the housing of reducing stand 10. A multiplier 39 receives force signal 38 and in effect multiplies it by the constant $1/M$ to give its output 40 the proper value to represent the mill spring 17. An $F/M$ register 41 receives signal 40 and gives its output 36 a corresponding digitally represented count value.

The stored value of $F/M$ signal 35 is held in an $F/M$ storage register 43. Storage register 43 is connectable by means represented schematically by an AND gate 44 to receive and store the existing count 36 of $F/M$ register 41 when gate 44 is opened. AND gate 44 is controlled by a signal 45 that will be described later.

So far, all the components of the automatic gauge control that operate (when the control is set up to have the proper stored references) to adjust the screw position S to maintain proper gauge have been described. These components operate in response to any changes in work roll force 18 and the associated signals, 38, 40, 36, and 27 to produce an off setting change in screw position 14 and the associated signal 26. For example, suppose that the value of $\lambda$ represented by functional box 12 changes in a way that causes the strip to be rolled overgauge for the existing setting of screw position 14. The increase in strip thickness 15 is accompanied by an increase in work roll force 18 and in the count value 36 of $F/M$ register 41. In response to the increased value of signal 36 in comparison with the stored $F/M$ value 35, $F/M$ comparator 34 produces a corresponding number of pulses at input 27 of $\Delta h$ register 25. A corresponding count value appears at $\Delta h$ register output 28 that causes screw positioner 16 to drive the screws closer together. As the screws are driven together, the work roll force 18 and $\Delta F/M$ signal 27 increase correspondingly. However, in response to changes in screw position 14, device 29 produces $\Delta S$ pulses at input 26 that oppose the effect of $\Delta F/M$ pulses 27. With the relationship that the control establishes between signals 26 and 27, $\Delta h$ register 25 reaches a zero count value at its output 28 and stops changing screw position 14 when the increase in work roll force 18 produces an increase in mill spring 17 equal to the change in screw position 14. Thus by changing input 14 and output 17 of adder 13 equally and oppositely, the gauge control regulates the other input of adder 13, strip thickness 15.

Screw return—Hold mode

The control has components that store a reference value of screw position. This value and the stored $F/M$ value 35 establish a reference thickness, $h=F/M+S$. As has been explained already, the reference values of S and $F/M$ are stored after screw positioner 16 has been adjusted for proper strip thickness 15. When the strip leaves reducing stand 10, the control drives the screws to the reference position. As will be explained in the section "Screw Return—Update Mode," the control readjusts the reference screw positions for each strip of a similar group. Because some of these components can be operated to hold the reference value of screw position from one strip to the next, it will be simpler to understand the update control after the components that would operate without update are described.

$\Delta h$ register 25 receives a signal 50 that counts register 25 the proper amount in the proper direction to run the screw position 14 to a reference position. Signal 50 is generated by a $\Delta S$ register 51, and it is controlled by means represented schematically by an AND gate 52 in response to a signal 53 that indicates that a strip has left stand 10 and the screws should be reset for the next strip. Signal 50 represents the difference between the actual screw position 14 and a reference screw position; and register 51 receives two inputs 54 and 55 that represent these quantities. The actual screw position signal 54 is generated by a screw position register 56, a counter that receives $\Delta S$ pulses 26 from device 29 and integrates them to produce a count value at its output 54 indicating the actual screw position. The reference screw position signal 55, called the set point, is generated by a set point register 57 that can be operated to receive a manual input 58 or can be controlled by means represented schematically by AND gate 59 to receive and store the existing value of screw position that is represented by signal 54. AND gate 59 is controlled by a signal 60 that will be described later.

Signal 53, which operates to give $\Delta h$ registers the count value 50 of $\Delta S$ register 51, is generated by any suitable means that responds to the exit of the strip from stand 10. A suitable indication that the strip has left the stand is a significant decrease in work roll force signals 38, 40. The drawing illustrates a device 63 that is connected to receive signal 40 and to produce a momentary signal at its output 64 when the work roll force decreases to substantially zero. Output 64 is connected to input 53 of AND gate 52 to open the gate. In response to the count value at its input 50, $\Delta h$ register 25 controls screw positioner 16 to adjust the screw position until enough $\Delta S$ pulses 26 have entered $\Delta h$ register 25 to count off the value set in by input 50 and $\Delta h$ signal 28 is returned to zero.

During this operation AND gate 37 is closed by the complement 64' (produced by NOT gate 65) of zero force signal 64 to prevent $\Delta F/M$ pulses from entering $\Delta h$ register 25. When the next strip enters reducing stand 10, AND gate 37 opens and $F/M$ comparator 34 supplies $\Delta F/M$ pulses at $\Delta h$ register input 27 according to the difference between the reference value 35 of F/M and the actual value 36 that exists at the head of the next strip.

*Screw return—Update mode*

In the update mode the control responds to the first zero error in gauge to open gates 44 and 59 to store the existing values of F/M and S in registers 43 and 57. A zero count value detector 66 has its input 67 connected to receive gauge error signal 28, and it energizes its output 68 whenever the count value of Δh signal 28 indicates that the gauge error is zero. Output 68 is connected to operate gates 44 and 59 only once for each strip, after the gauge control has obtained proper gauge by using the reference values of F/M 35 and set point 55 generated during operation on the preceding strip. Zero gauge error detector 66 has its output 68 connected to set a flip-flop 69 in response to zero gauge error. (AND gate 72 is open as will be explained.) When flip-flop 69 is set, it energizes its 1 output and momentarily (as the capacitor represents schematically) energizes the inputs 45 and 53 of AND gates 44 and 52. This operation causes set point register 57 to store a value that corresponds to the screw position when the control first obtained proper gauge, and it causes F/M storage register 43 to store the corresponding F/M value 36. Any change made in set point register 57 is offset by an equal and opposite change in F/M storage register 43; consequently, the automatic gauge control keeps regulating for the same value of strip thickness 15.

Flip-flop 69 is connected to be reset by zero force detector 63 only after the strip has left stand 10. When the next strip enters stand 10, the control has the improved value of set point 55 developed during operation on the preceding strip and it is ready to store a further improved value as soon as the gauge control obtains the reference thickness. AND gate 72 and a NOT gate 73 are provided to inhibit zero error detector 66 from setting flip-flop 69 during the interval between successive strips.

The update control can be used with automatic gauge controls with different means to hold the reference values than the means of the drawing. For example, some automatic gauge controls connect the ΔS register 51 to receive and count ΔS pulses 26 continuously. Thus the output 50 of ΔS register 51 is the distance of the screw position 14 above or below a reference position where the count value at output 50 is zero. To update this reference, line 60 is connected to be an input to reset ΔS register 51 to zero when the reducing stand 10 first gets proper gauge.

From the description of one automatic gauge control and the single embodiment of the update control, those skilled in the art will recognize that within the scope of the claims the update control can be used with various other control devices that use stored parameters for operating on successive similar subjects, that a variety of well known components can be used to make up the functional blocks of the drawing, and that the illustrated functional relationship between the blocks of the drawing can be varied by well known design techniques.

Having now particularly described and ascertained the nature of our said invention and the manner in which it is to be performed, we declare that what we claim is:

1. In a control for a device that operates on a relatively moving subject according to factors that include the position of the device, means for storing a reference position for said device,
    means responsive to one subject leaving said device for positioning the device to a said reference position to begin operating on a succeeding subject,
    means responsive to an error in the operation on the subject to change the position of said device in a direction to correct the error, and
    means responsive to the position of the device and to the first occurrence of zero error in operating on the subject to produce and store in said storage means a new reference position for said succeeding subject corresponding to the position of the device when the error is first zero.

2. A control for repositioning the work rolls of a reducing stand, after one subject has left the stand, to a position that will produce nearly correct gauge when the succeeding subject enters the reducing stand, comprising,
    means to store a value of work roll position as a reference for repositioning the work rolls,
    means for detecting error in the gauge of the subject being rolled in said work rolls and for generating an error signal which is a function of said error in gauge,
    screw positioning means for varying the position of said work rolls in a direction to minimize said error signal,
    signal deriving means for producing a work roll position signal indicating the position of said work rolls,
    means responsive to said work roll position signal and to said stored reference value and being operable after one subject has left the reducing stand and before the succeeding subject enters the reducing stand to operate said screw positioning means to reposition the work rolls to said reference position, and
    means operable after each subject enters said work rolls and being responsive to zero magnitude of said error signal to actuate said storage means to store the then existing value of work roll position as a new reference for next repositioning said work rolls after the subject being rolled has left the reducing stand.

3. A control for a reducing stand of a rolling mill having work rolls for reducing the thickness of elongated metallic strip and a screw for varying the position of said work rolls, said control including
    means for deriving a signal which is a function of screw position,
    means for storing a reference value of screw position,
    means responsive to each strip leaving said work rolls to reposition said work rolls to the position corresponding to said stored reference value,
    means for actuating said screw in a direction to minimize the variation in thickness of the strip being rolled from the desired thickness, and
    means responsive to the first zero error in the thickness of the strip being rolled to actuate said storage means to change the information stored therein to a new reference value which is a function of the screw position signal then being generated by said signal deriving means.

4. In a rolling mill having work rolls, means to change the position of said work rolls in a direction to minimize variations in thickness of a strip being rolled from a desired gauge, means for storing a reference value of work roll position, and means operable after one strip has left and before the succeeding strip enters said work rolls and being controlled by said stored value to reposition said work rolls to said reference position, an update control comprising,
    means for producing a screw position signal indicating the position of said work rolls,
    means operable after each strip enters said work rolls for generating a zero error signal when said work rolls have first been moved to the position wherein said variation in thickness from said desired gauge is zero and said strip is being rolled to the desired thickness, and
    means responsive to said zero error signal to store in said storage means the value of screw position signal then being derived by said signal producing means as a new reference value of work roll position.

5. An update control for an automatic gauge control of the type having a register receiving first and second inputs indicating changes in first and second parameters of a reducing stand and producing an output indicating an error in thickness of a strip being rolled in said reducing stand, means responsive to said output for changing one of said parameters in a direction to correct said error, and storage registers for storing reference values of said parameters, said update control comprising, means operable after each strip enters said reducing stand and being responsive to said output indicating error in strip thickness to produce a zero error signal when said one parameter is changed until said output is zero and zero error exists in the thickness of the strip being rolled.

means responsive to said zero error signal to actuate said storage registers to change the information stored therein to the then existing values of said first and second parameters, and means for permitting said storage registers to change the values stored therein only once during passage of each strip through said reducing stand.

6. An update control for a rolling mill automatic gauge control having means to store reference values of a screw position and work roll force, means to derive signals indicating changes in screw position and work roll force from said reference values, a register receiving said derived signals as inputs and producing an output indicating error in the gauge of the strip being rolled as a function of unequal changes in said inputs, and screw positioning means controlled by said output for varying the position of the work rolls of said mill in a direction to correct said error, said update control comprising, means operable after each strip enters the work rolls and being responsive to zero register output to produce a zero error signal when said inputs are first changed to roll the strip in said work rolls to correct gauge, means responsive to said zero error signal to couple said signal deriving means to said storage means and operate said storage means to change the reference values stored therein to the then existing values of screw position and work roll force, means for permitting said storage means to change the information stored therein only once during passage of each strip through said rolling mill, and means operable after each strip leaves said rolling mill and before the succeeding strip enters said mill to control said screw positioning means in accordance with said stored reference value of screw position and reposition said work rolls to the position corresponding to said stored reference value of screw position.

7. In a reducing stand having work rolls for reducing elongated metallic strip, means to detect error in the thickness of strip being rolled in said reducing stand, and screw positioning means for varying the position of said work rolls in a direction to reduce said error, in combination, a register for storing a screw position signal corresponding to a reference work roll position, means responsive to each strip leaving said work rolls to couple said register to said screw positioning means and actuate said screw positioning means to reposition said work rolls in accordance with the value of screw position signal stored in said register, means for generating a signal which is a function of actual work roll position, and means operable after each strip enters said work rolls and responsive to the first occurrence of zero error sensed by said detecting means for coupling said signal generating means to said register and changing the information stored in said register to the screw position signal then being derived by said signal generating means.

8. In combination, a reducing stand having work rolls for rolling successive elongated strips and a screw for varying the spacing of said work rolls, means to store reference values of screw position and force on said work rolls, means to derive signals which are functions of variations in screw position and work roll force from said reference values, means for adding said derived signals and for generating an error signal which is a function of their difference, means controlled by said error signal for positioning said screw to vary the work roll spacing in a direction to minimize said error signal, said adding means generating a zero error signal when said strip is being rolled to desired thickness in said work rolls, means for integrating said derived signals and for producing signals which are functions of actual screw position and actual force on said work rolls, and means operable after each strip enters said work rolls and being responsive to said zero error signal for actuating said storage means to change the information registered therein and store signals which are functions of existing values of screw position and work roll force produced by said integrating means.

9. In the combination defined by claim 8 and including means for permitting operation of said last named means only once during passage of each strip between said work rolls.

10. In the combination defined by claim 8 and including means responsive to absence of a strip from between said work rolls to energize said adding means in accordance with said stored reference value of screw position to generate an error signal which will actuate said screw positioning means to reposition said work rolls to the reference screw position.

11. A gauge control for a reducing stand having work rolls for rolling successive elongated strips and a screw for varying the position of said work rolls, register means to store reference value of screw position and force on said work rolls, means to derive signals which are functions of screw position and force on said work rolls, means for adding said derived signals and for generating an error signal which is a function of their difference, means controlled by said error signal for positioning said screw to vary said work roll spacing in a direction to minimize said error signal, said adding means generating a zero error signal when said strip is being rolled to correct gauge by said work rolls, means operable after each strip enters said work rolls and responsive to said zero error signal to actuate said register means to change the information therein and store the then existing values of screw position and force on said work rolls, and means responsive to absence of a strip from between said work rolls to couple said stored reference value of screw position to said adding means and actuate said adding means to generate an error signal which will control said screw positioning means to reposition said work rolls to the position corresponding to the value of screw position stored in said register means.

12. A control for a reducing stand of a rolling mill having work rolls for reducing the thickness of elongated metallic strip and a screw for varying the position of said work rolls, said control including means for deriving signals which are functions of screw position and work roll force, means for storing a reference value of screw position, means responsive to each strip leaving said work rolls to reposition said work rolls to the position corresponding to said stored reference value of screw position, means for comparing said derived signals, means controlled by the output of said comparing means for actuating said screw in a direction to minimize the variation in thickness of the strip being rolled from desired thickness, and means responsive to zero error in the thickness of said strip being rolled to actuate said storage means to change the information stored therein to a new reference value which is a function of the then existing value of screw position.

References Cited by the Examiner
UNITED STATES PATENTS

| 2,972,268 | 2/1961 | Wallace et al | 72—8 |
| 2,982,901 | 5/1961 | Cannon | 72—16 |
| 3,204,440 | 9/1965 | Thompson | 72—8 |

CHARLES W. LANHAM, *Primary Examiner.*

L. A. LARSON, *Assistant Examiner.*